Aug. 1, 1950 W. A. WILSON 2,517,366
PIPE TONG DIE
Filed March 1, 1948
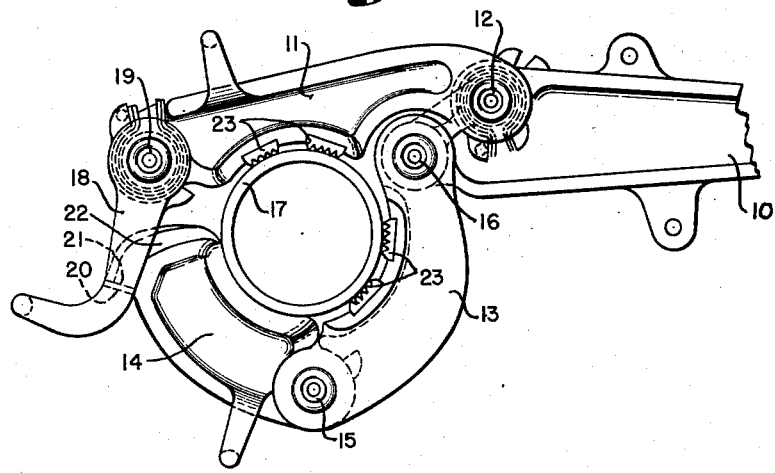
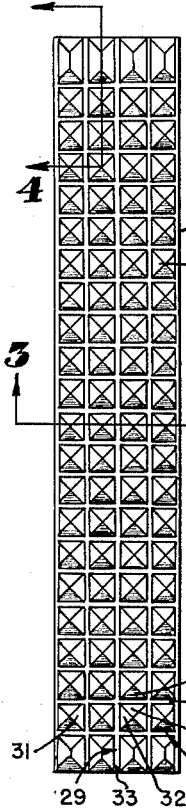
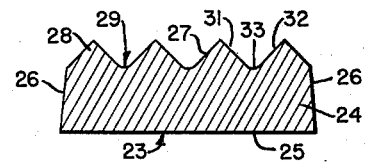
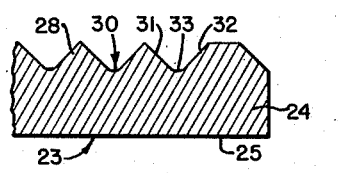
Inventor
WILLIAM A. WILSON
Attorney Patented Aug. 1, 1950

2,517,366

UNITED STATES PATENT OFFICE 2,517,366

PIPE TONG DIE

William A. Wilson, Los Angeles, Calif., assignor to Web Wilson Oil Tools, Incorporated, Huntington Park, Calif., a corporation of California Application March 1, 1948, Serial No. 12,460

1 Claim. (Cl. 81—186)

The present invention relates generally to tools, and is more particularly concerned with improvements in the die elements of tools of the type characterized by pipe tongs, such as utilized in the oil industry, although the invention is susceptible of general application.

It is an object of the herein described invention to provide an improved tool die construction having a plurality of work engaging teeth, wherein sharp corners at the base of the teeth where it emerges from the die body will be eliminated, and the teeth are respectively provided with sloping surfaces so that the metal will be put under compression, rather than tension or shear stresses. Such construction is advantageous in substantially eliminating tooth breakage under working conditions, thus reducing die replacement and upkeep to a minimum.

A further object of the invention is to provide an improved tool die construction in which a toothed working face is provided, and the teeth are so designed that substantially point engagement of the teeth with the work piece is secured, the point engagement functioning to provide relatively high unit bearing pressure. Moreover, such point engagement of the teeth are further advantageous in that spaced point indentations will be made on the surface of the work piece, rather than elongate grooves as would result in the case of line engagement between the die and the work piece. This is particularly important in the case of pipe tools in the oil well industry, since the pipe wall, when engaged by the teeth of the present invention, will be less weakened and less susceptible to rupture under operating pressures therein.

Still another object of the invention is to provide a tool die in which the teeth are of symmetrical construction having opposed surfaces in a direction transversely of the die, these surfaces being inclined at corresponding angles so that pressure will be applied through similar surfaces to the work upon transverse movements of the die in opposite directions. Moreover, such construction results in a tool die that may be reversed end-for-end without affecting the efficiency and operation of the die. This is a particular advantage in the field where personnel are not always too careful to see that parts are assembled in correct operating position. The present die may be inserted in the tool without consideration to the direction of rotation of the tool, and thus makes for a fool-proof assembly.

Further objects of the invention will be brought out in the following part of the specification, wherein detailed description is for the purpose of fully disclosing preferred embodiments of the invention without placing limitations on the scope of the invention defined in the appended claim.

Referring to the drawings, which are for illustrative purposes only:

Fig. 1 is a plan view of a pipe tong having dies embodying the features of the present invention;

Fig. 2 is an enlarged plan view of one of the dies, looking toward its working face;

Fig. 3 is a transverse sectional view of the die, taken substantially on line 3—3 of Fig. 2; and Fig. 4 is a partial longitudinal section of the same, taken substantially on line 4—4 of Fig. 2.

As illustrative of a tool utilizing dies of the type described herein, there is shown in Fig. 1 a pipe tong tool such as utilized in the oil well industry for screwing together and unscrewing pipe sections.

Briefly, the pipe tong comprises a handle 10 which is tapered from its jaw carrying end to its free end. This handle may be of any suitable construction, and, for lightness, may be of I-section to give it greater strength.

At its jaw end, the handle is provided with a long jaw 11 which is pivoted at one end for swinging movement by means of a pivotal connection including a pintle pin 12. This pivotal connection, which is inwardly spaced somewhat from this end of the handle, may be considered as the working pivot means of the tong.

In operative relation with the long jaw 11, articulate jaw means are provided consisting of a short jaw 13 pivotally connected at one end with an intermediate jaw 14 by a pivotal connection 15. The other end of the short jaw 13 is pivotally connected to the jaw end of the handle 10 by means of a pintle 16 which forms the fulcrum pivot of the tong.

The jaws are arranged to be clampingly secured in operative position around a work piece, in this instance, a pipe as indicated at 17. For such purpose, the outermost end of the long jaw 11 has a latch member 18 mounted for swinging movement about a pivotal connection including pivot pin 19. This latch member is generally U-shaped and includes a flat latching surface 20 adapted to extend over a flat face or surface 21 of an end lug 22 carried by the intermediate jaw 14 at its outermost end.

As shown, the jaws 11, 13, and 14 are provided with inner curved faces to generally accommodate them to the pipe surface. In order to grippingly engage the outer surface of the pipe, the jaws are provided with dies 23 which are removably supported as by a dovetail connection.

Referring specifically to Figs. 2, 3 and 4, it will be noted that the die is in general of rectangular construction, and may be fabricated from bar steel having suitable hardness characteristics.

Each die comprises a body portion 24 having a planar back surface 25 and side walls 26 which are inwardly inclined toward a forward or working face 27.

As clearly shown in Fig. 2, the working face of the die is provided with a plurality of projecting teeth 28 which are longitudinally and transversely aligned of the die. Any suitable method may be utilized to form these teeth, one of which is by machining the working face to form intersecting grooves 29 and 30. In the illustrated construction, these grooves are in right angled relation, the grooves 29 being in spaced parallel relation and extending longitudinally of the die; whereas, the grooves 30 are arranged in parallel relation and extend transversely of the die body.

As shown in Figs. 3 and 4, the grooves 29 and 30 are of similar construction and each groove has oppositely inclined rim margins which form divergent side walls 31 and 32. The bottom of each groove is rounded as shown at 33 so as to eliminate sharp corners. By similarly spacing the longitudinally extending grooves with respect to each other and the transversely extending grooves with respect to each other, the teeth 28, which are formed on the working face of the die, are of pyramidal formation having their side faces inclined at the same angle and converged to a common apex point for engagement with the work piece.

The above described symmetrical construction permits end-for-end reversal of the die without in any way affecting its operation. The transversely opposed faces of each tooth present similarly inclined pressure applying surfaces which will respectively bear against the work piece, depending upon which way the die is moved with relation to the work piece. It therefore produces a fool-proof construction, and it is unnecessary for an operator in the field to concern himself with the manner in which the die is inserted in the tool, since it will function properly irrespective of which end is inserted first.

The particular tooth construction described above eliminates sharp corners which would result in the tooth material being put under tension or shear stresses. In the present arrangement, the material is placed under compressive stress so that the possibility of tooth breakage is reduced to a minimum.

The provision of a plurality of teeth, both longitudinally and transversely of the die, such teeth having point contacts, effects increased unit bearing pressure so that the die more effectively grips the work piece, and disconnected indentations are made in the work piece surface. This is particularly advantageous in the case of pipe such as used in the drilling of oil wells, as weakening of the pipe surface is materially reduced and the possibility of rupture under pressure materially lessened, if not eliminated.

I claim as my invention:

As an article of manufacture, an end-for-end reversible pipe tong die, comprising: an elongate body structure having a working face; and a plurality of longitudinally extending grooves and transversely extending grooves on said working face in intersecting relation, said grooves having outwardly diverging side walls and cooperating to form a transverse row of elongate teeth at each end of the body having work engaging edges extending lengthwise of the body; and pyramidal teeth between said end rows having substantially pointed work engaging apices.

WILLIAM A. WILSON.

REFERENCES CITED

The following references are of record in the file of this patent:

UNITED STATES PATENTS

| Number | Name | Date |
| --- | --- | --- |
| 606,591 | Slack | June 28, 1898 |
| 1,844,616 | Whiton | Feb. 9, 1932 |
| 2,374,192 | Godfrey | Apr. 24, 1945 |
| 2,406,520 | Wilson | Aug. 27, 1946 |